United States Patent [19]
Knecht et al.

[11] Patent Number: 4,850,460
[45] Date of Patent: Jul. 25, 1989

[54] HYDRAULIC ADJUSTABLE SHOCK ABSORBER

[75] Inventors: Heinz Knecht, Eitorf; Alfred Preukschat, Königswinter, both of Fed. Rep. of Germany

[73] Assignee: Boge AG, Fed. Rep. of Germany

[21] Appl. No.: 176,640

[22] Filed: Apr. 1, 1988

Related U.S. Application Data

[63] Continuation-in-part of Ser. No. 915,265, Oct. 3, 1986.

[30] Foreign Application Priority Data

Apr. 13, 1987 [DE] Fed. Rep. of Germany ....... 3712477

[51] Int. Cl.$^4$ .................... B60G 17/08; F16F 9/46
[52] U.S. Cl. .................... 188/299; 137/487.5; 188/315; 188/322.13
[58] Field of Search ............ 188/299, 311, 313, 316, 188/163, 314, 315, 317, 318, 319, 320, 322.13, 322.17; 251/129.05; 137/487.5; 280/707, 714

[56] References Cited

U.S. PATENT DOCUMENTS

| | | | |
|---|---|---|---|
| 3,219,095 | 11/1965 | Nilsson | 251/129.05 |
| 3,446,473 | 5/1969 | Barker | 251/129.05 |
| 3,523,676 | 8/1970 | Barker | 251/129.05 |
| 4,313,529 | 2/1982 | Kato et al. | 280/714 |
| 4,589,528 | 5/1986 | Axthammer et al. | 188/322.17 |

FOREIGN PATENT DOCUMENTS

| | | |
|---|---|---|
| 1242945 | 3/1964 | Fed. Rep. of Germany. |
| 2119531 | 4/1971 | Fed. Rep. of Germany. |
| 0112820 | 7/1983 | Japan ................ 188/299 |
| 0174773 | 10/1983 | Japan ................ 251/129.05 |

*Primary Examiner*—Andres Kashnikow
*Assistant Examiner*—Matthew C. Graham
*Attorney, Agent, or Firm*—Nils H. Ljungman

[57] ABSTRACT

Shock absorber for vehicles, in which there is a damping element, which has a work cylinder holding a damping medium and divided into two work chambers by a piston, whereby at least partly to control the damping force, an electromagnetically activated and axially moving valve body of a valve pressurizes a flow passage. A variable damping adjustment becomes possible, and by means of a variably controlled damping valve, any desired adjustable damping of the decompression and compression stage can be achieved. In addition, by varying the effective hydraulically-influenced functional surfaces of the valve body, the switching, frequency, closing and opening action of the valve body, designed as the armature of an electromagnet, can be influenced. A seat surface is oriented together with the end surface of the valve body, whereby at least a portion of the end surface of the valve body and of the valve seat are located at a distance from one another. Varying the effective hydraulically-influenced functional surfaces of the valve body, the switching, frequency, closing and opening action of the valve body, can be influenced. This configuration makes is possible to achieve a partial pressure reduction influencing the valve body in the area of the valve seat.

19 Claims, 9 Drawing Sheets

HYDRAULIC ADJUSTABLE SHOCK ABSORBER

This application is a continuation-in-part of application Ser. No. 915,265 now U.S. Pat. No. 4,749,064 (Attorney Docket No. NHL-BGG-24), filed on Oct, 3, 1986, entitled "A Vibration Damper for Motor Vehicles Having an Arrangement for Varying Damping Thereof", now allowed, and incorporated herein by reference as if the entire contents thereof were fully set forth herein, which corresponds to Federal Republic of Germany Patent Application No. P 35 35 287.6, filed on Oct. 3, 1985, which German patent is also incorporated herein by reference as if the entire contents thereof were fully set forth herein.

BACKGROUND OF THE INVENTION

1. Field of the Invention

This invention relates to a hydraulic, adjustable shock absorber with a piston fastened to a piston rod, which piston divides a work cylinder into two work chambers filled with damping fluid, whereby at least partly to control the damping force, an electromagnetically activated and axially moving valve body of a valve pressurizes a passage, whereby the valve body has a hydraulic connection running from the passage to the rear end surface of the valve body, and whereby a seat surface oriented at approximately right angles to the axis of rotation of the valve body, and the end surface of the valve body, form a valve seat.

2. Description of the Prior Art

The prior art includes hydraulic shock absorbers, for example, German Patent Publication Published for Opposition Purposes No. DE-AS 12 42 945, whose damping characteristic can be regulated by changing the flow of the hydraulic damping medium by means of electromagnetic damping valves. In such examples of prior art, there is a bypass connection which is used to control the damping force in the decompression stage. To change the damping force in the presence of different road conditions in the decompression stage, there is a bypass connection, in which there is an electromagnetically controlled valve. The passage is controlled via the valve body by means of an appropriately sized electromagnet.

The prior art also includes hydraulic, adjustable shock absorbers, for example, German Laid Open Patent Application No. DE-OS 21 19 531, in which there is a first damping element, as well as a line equipped with a regulating valve. A regulating valve and a damping element are each located separately in a closed loop. The adjustment of the regulating valve is thereby done manually, or by the action of one of the vehicle mechanisms.

The above-mentioned patent publications are incorporated herein by reference as if the entire contents thereof were fully set forth herein.

OBJECT OF THE INVENTION

The object of the invention is to create a motor vehicle damping system with a variable, intelligent, electronic damping adjustment for the decompression and compression stages, so that by means of a variably controlled, compact damping valve, not only can any desired adjustable damping be obtained in the decompression and compression stage, but so that by variation of the effective hydraulically influenced functional surfaces of the valve body, the switching, frequency, closing and opening action of the armature of the electromagnet, designed as a valve body, can be controlled.

SUMMARY OF THE INVENTION

The invention achieves this object, in that at least a portion of the end surface of the valve body and of the valve seat are at a distance E from one another, whereby the ratio of the pressurized end surface to the rear pressurized end surface is 0.5–1.0, and the ratio of the pressurized annular surface to the rear pressurized end surface is 0–0.5.

One advantage of this solution is that such a damping valve can be installed in different variations in the vibration damping system of a vehicle. It is thereby possible to locate the damping valve parallel to the conventional throttle valves in the damping piston and/or in the cylinder base, or to locate it in damping piston and to locate only the check valves, if any, in the cylinder base, so that the damping valve is installed in a bypass. When used in lockable vibration dampers, it is possible to install the damping valve without the presence of other throttle valves in the damping piston and in the base area.

Moreover, by optimizing the hydraulically influenced functional surfaces of the valve body in relation to one another, a rapid closing and opening action can be achieved, as well as a secure closing and opening under all operating conditions, whereby a compact construction is possible with a low electric current requirement. As a result of the configuration as an electromagnetic seat valve with an axially moving valve body in a guide slot and a valve body pressurized on both ends, the opening of the valve can be achieved by using only magnetic force, and the closing of the valve by means of spring force and the hydraulic compression force of the damping system itself. This allows the use of very small electromagnets, since only a low electric current is required.

Another advantage is that, in the area of the valve seat, there is a differential pressure force on the valve body. The valve body, of course, is primarily pressurized on both end surfaces by means of the hydraulic connection at the same pressure, but in the area of the valve seat, when the valve is open, as a result of the flow of the damping medium, there is a partially reduced pressure in relation to the area around the valve seat. This differential pressure is used to assist the valve spring, so that when the electromagnet is off, not only does the valve spring close the valve body, but simultaneously, the partial pressure reduction exerts a force of the valve body. This additional force makes possible a rapid closing action under all operating conditions, whereby the switching time is reduced with increasing relative speed of the vibration damper.

When the inflow is from inside, the annular surface of the valve body on the outside circumference can be close to 0. With a radial inflow of the valve body for the outside and an outer annular surface, a closing force is produced, which assists the valve spring in closing the valve.

In one advantageous embodiment, the valve body has a cylindrical outer surface.

In one configuration of the invention, at least a portion of the end surface of the valve body is conical.

Depending on the particular embodiment, another essential characteristic is that the end surface of the valve body is plane, and that the area adjacent to the valve seat has a recess, which is located at some distance from the end surface of the valve body.

One advantage of this configuration is that the use of a cylindrical valve body with a plane end surface and which is technically simple is specified, and that the area adjacent to the valve seat is recessed.

In all the solutions, the surface located at the distance E means that when the damping medium flows in at a specified pressure, in the area of the valve seat, a reduction of the cross section results in an increase in the speed of the damping medium, so that the pressure is reduced correspondingly. Bernoulli's Law applies here. As a result of the partial pressure reduction, the valve spring of the valve body is assisted. For the closing and opening action under all operating conditions, it is thereby unimportant whether the end surface of the valve body is at a distance from the valve seat surface, or whether they are adjacent to the valve seat, has a recess located at a distance from the end surface of the valve body.

To influence the damping force curve during switching of the valve body, an essential characteristic of the invention specifies that the ratio of the effective cross section surface of the hydraulic connection to the rear pressurized end surface is 0.002–0.85.

One aspect of the invention resides broadly in a vibration damper for motor vehicles, the damper comprising a cylinder assembly having an arrangement for varying damping of a piston assembly disposed therein, the piston assembly dividing the cylinder into at least two chambers, each for containing damping fluid, the vibration damper comprising: an arrangement for throttling the damping fluid when the damping fluid moves from one of the chambers into another; the piston assembly having a piston rod and piston; the piston rod having first an arrangement for attachment of the piston rod at one end thereof; the cylinder assembly having a second arrangement for attachment at a portion thereon other than the first arrangement for attachment at the piston rod; an arrangement for bypassing at least a portion of the damping fluid; an arrangement for accepting bypassed damping fluid, the bypassing arrangement being disposed to bypass the damping fluid from one of the damping fluid-containing chambers to the accepting arrangement, the bypassing arrangement including a damping valve arrangement for regulating flow of the damping fluid in the bypassing arrangement; the valving arrangement including: an electromagnetically-displaceable component for effecting a substantial snap-action change between a closed flow cross section and an open flow cross section in the valving arrangement; and an electromagnetic arrangement for varying the cross section flow of the valving arrangement between the closed and open flow cross sections by displacing the electromagnetically-displaceable component, the electromagnetic arrangement having an arrangement for connection to controlling circuitry; the electromagnetically-displaceable component having at least one upstream surface for being exposed to higher pressure in a closed position of the valve arrangement than at least one downstream surface, the at least one downstream surface having an area which is chosen from a member of the group consisting essentially of an area equal to and an area smaller than the area of the at least one upstream surface to aid in snap-action transition of the electromagnetically-displaceable component from the open flow cross section to the closed flow cross section; the valve arrangement having a valve seat; the electromagnetically-displaceable component having a first end and a second end, the first end having at least one of the at least one downstream surfaces disposed thereon; the first end having a first portion, for contacting the valve seat, and a second portion disposed closer toward the second end than the first portion is disposed to the second end, the second portion for being displaced away from and avoiding contact with the valve seat.

Preferred embodiments of the are schematically illustrated in the accompanying figures.

DESCRIPTION OF THE PREFERRED EMBODIMENTS

Figures 1, 2:
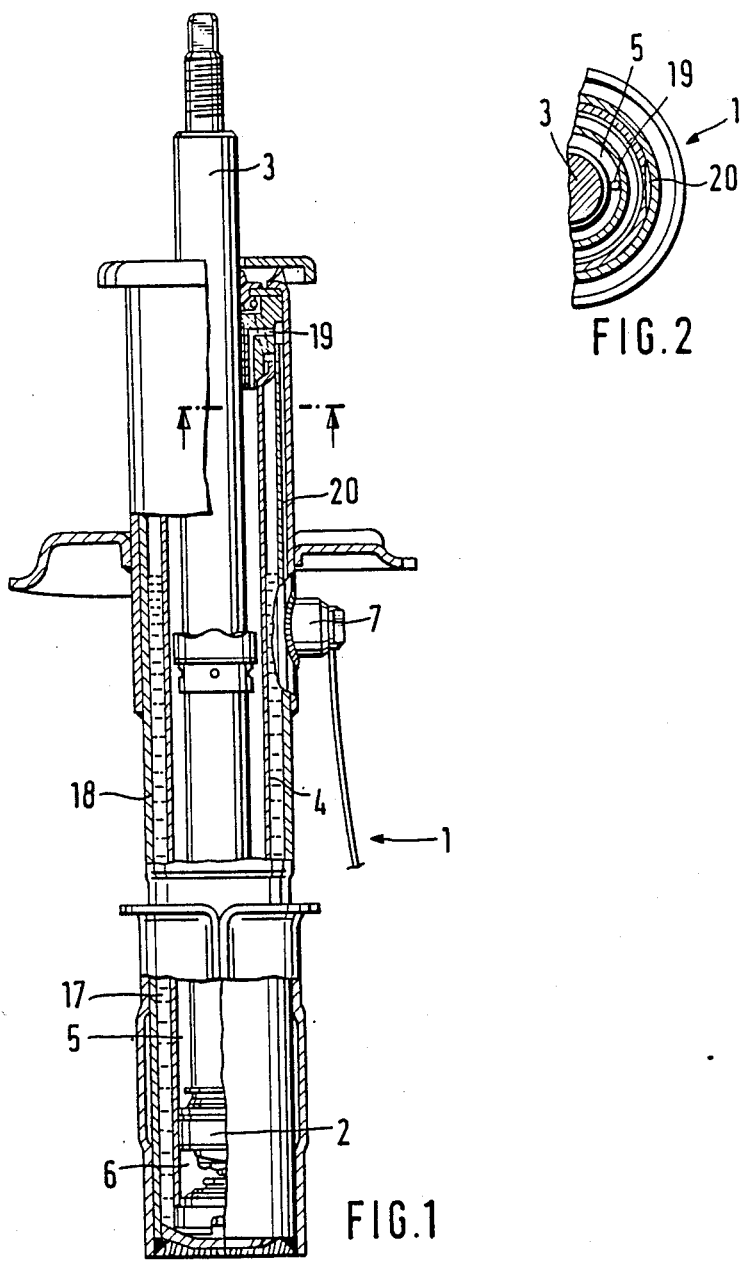
FIG. 1 shows a shock absorber in partial cross section.
FIG. 2 shows a cross section in the area of the bypass through the shock absorber shown in FIG. 8.

The shock absorber 1 shown in FIG. 1 is a telescoping strut with two tubes. It consists essentially of the damping piston 2, the piston rod 3 and the working cylinder 4. The damping piston 2 divides the work cylinder 4 into the upper work chamber 5 and the lower work chamber 6. The damping piston 2 is also equipped with damping valves. In the base of the work cylinder 4 there are other valves, by means of whose cross sections the volume compressed by the piston rod is forced into the equalization chamber 17. The equalization chamber 17 is formed by the wall of the work cylinder 4 and the inside wall of the jacket tube 18.

A flow connection leads from the upper work chamber 5 via the channel 19, the bypass 20 and the valve 7, there is a flow connection into the equalization chamber 17. In this flow connection, the valve 7 controls a variable fluid circulation.

FIG. 2 shows a cross section of the shock absorber 1, whereby the piston rod 3 is located in the center, and the upper work chamber 5 is connected via the channel 19 and the bypass 20 with the equalization chamber 17. The bypass channel 20 in this embodiment is formed by a locally ground tube.

Figure 3:
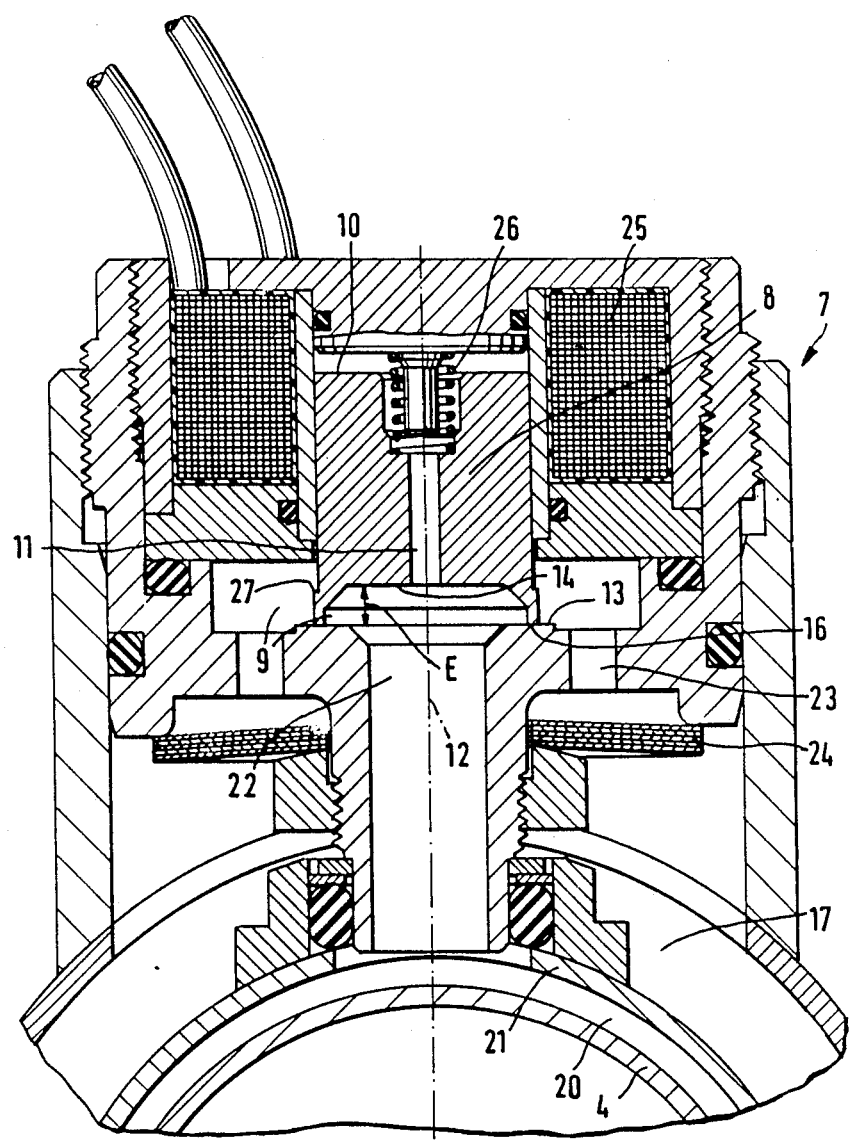
FIG. 3 shows an electromagnetically activated valve in cross section.

FIG. 3 shows a valve 7 in cross section, whereby the work cylinder 4, together with the tube 21, forms the bypass 20. Starting from the bypass 20, the valve receives the flow via the inflow hole 22, and the damping medium then flows past the valve body 8 on the valve seat 16, via the outflow holes 23, and then passes a spring plate valve 24 into the equalization chamber 17. The valve 7 itself, by the interaction of the electromagnet 25, the spring 26 and the hydraulic pressure, thereby controls the valve body 8 which influences the passage 9. The recess 11 in the valve body 8 guarantees a pressure equalization between the rear end surface 10 and the end surface 14 of the valve body 8. As a result of the special configuration, at approximately right angles to the axis of rotation 12 of the valve body 8, a seat surface 13 is formed, which is at a distance E, which may be typically about 2 mm to about 3 mm, from the end surface 14 of the valve body 8. On account of the configuration of the end surface 14, there is a partially reduced pressure on the valve seat 16 during the flow of the damping medium from the inflow hole 22 into the outflow holes 23. On account of the differential pressure, the valve spring 26 is assisted in its closing action.

Configurations are possible in which the inflow of the valve body 8 takes place via the flow passage 9 radially from its outside. In that case, by using the annular surface 27, a force can be applied to the valve body 8, which also assists the valve spring 26.

Figure 4:
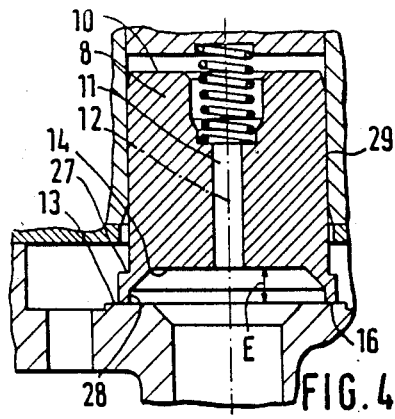
FIGS. 4–8 show various embodiments of the valve body in cross section.

FIG. 4 illustrates a valve body 8, in which the end surface 14 is partly conical, and in which there is an annular surface 27 on the outside of the valve body 8. The valve seat 16, together with the seat surface 13, thereby forms a control edge. The embodiment of this valve body 8 thereby exhibits an end surface 14, whose inside diameter 28 is at the maximum equal to the outside diameter 29 of the valve body 8. The plane portion of the end surface 14 of the valve body 8 is thereby located at the distance E from the valve seat 13.

Figure 5:
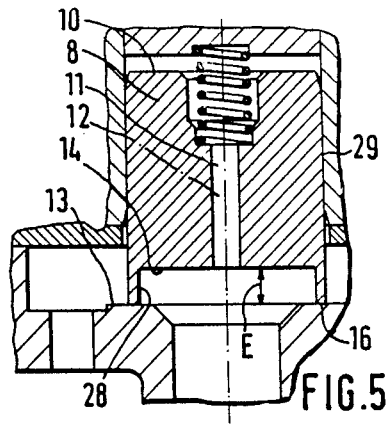

In the embodiment illustrated in FIG. 5, the valve body 8 has a cylindrical outer surface, whereby the end surface 14 is located at a distance E from the valve seat 13, so that the valve seat 16 is formed by the selection of the diameter of the end surface 14.

Figure 6:
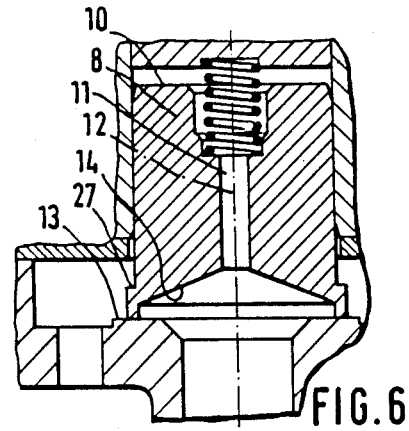
Figure 7:
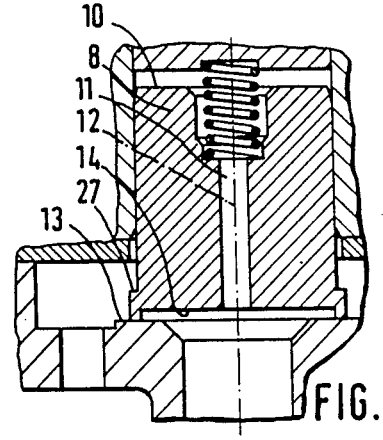

The variant illustrated in FIG. 6 has a conical end surface 14, whereby again, the annular surface is located on the outer surface of the valve body 8. By contrast, FIG. 7 shows an end surface 14 oriented at approximately right angles to the axis of rotation 12 of the valve body 8, whereby again the annular surface 27 indicates that these valve bodies 8 are used, among other things, when the inflow of the valve body is from outside.

Figure 8A:
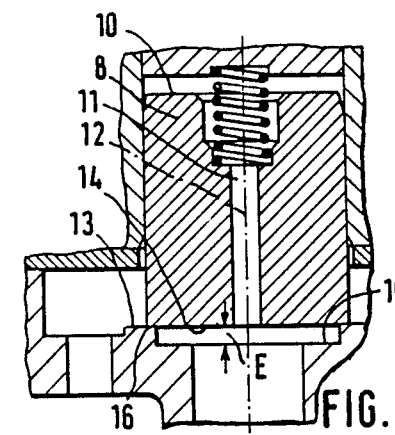
Figure 8B:
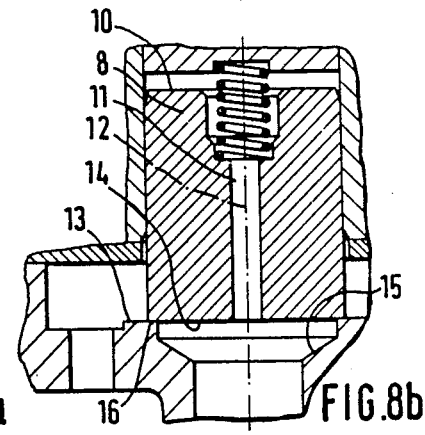

FIG. 8a shows a cylindrical valve body 8 with a plane end surface 14. There is a recess 15 in the area adjacent to the seat surface 13, so that by means of this configuration, once again the end surface 14 of the valve body 8 is at a distance E from the corresponding opposite surface. The seat surface 13 simultaneously determines the geometry of the valve seat 16. FIG. 8b shows a conical recess 15.

The geometry of all the valve bodies 8 in FIGS. 4–8 shows that in the area of the valve seat 16, there is a narrower cross section than in the corresponding neighboring areas. As a result of this geometry, when the valve body 8 is open, there is an increase in the speed of the damping medium in the area of the valve seat 16, so that when damping medium is flowing, the differential pressure in the area of the valve seat 16 in comparison to the adjacent area makes it possible to assist the action of the valve spring 26.

The components of the shock absorber according to the embodiments of the present invention are shown to be at relative scale to one another. Some shock absorbers are about 5 to 10 inches in diameter and, therefore, the parts are in scale to the diameter of the shock absorber. In other types of shock absorbers with other diameters, the parts may be of the size similar to the 5 to 10 inch diameter ones, or they may have other dimensions in relation to the dimension thereof.

Figure 9:
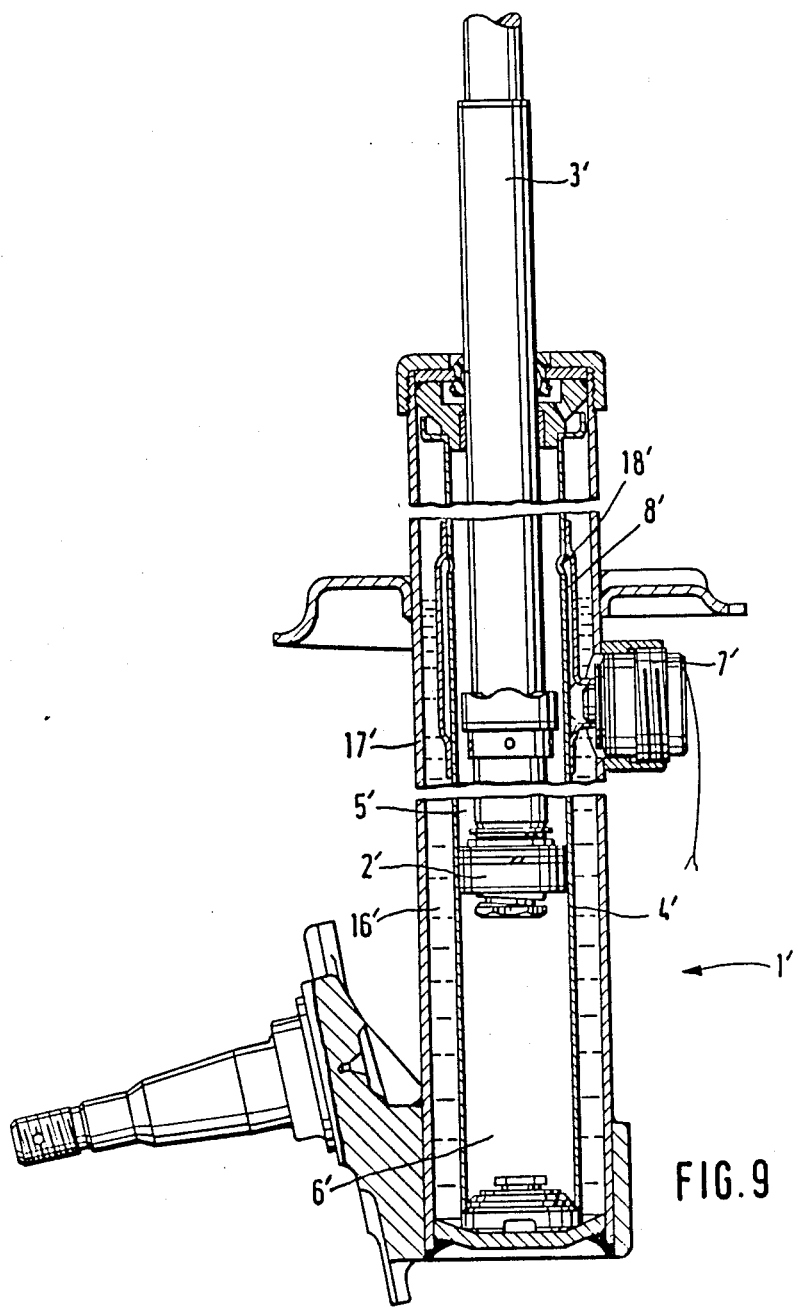
FIG. 9 shows a hydraulic shock absorber with a damping valve, in partial cross section.

The description of the preferred embodiments of the parent application Ser. No. 915,265 are included infra:

The vibration damping system illustrated in FIG. 9 is a shock absorbing strut in a double-tube model. The theory of the invention, however, can also be applied in other types of shock absorbers, such as single-tube shock absorbers, gas shock absorbers, etc. The shock-absorbing strut 1' illustrated in FIG. 9 consists essentially of the work piston 2', the piston rod 3' and the work cylinder 4'. The work piston 2' divides the work cylinder 4' into the upper work chamber 5' and the lower work chamber 6'. The work piston 2' is also equipped with damping valves (not shown) which are well known in the prior art. In the floor of the work cylinder 4', there are other valves, over whose cross sections the volume displaced by the piston rod 3' is displaced into the equalization chamber 16'. The equalization chamber 16' is formed by the wall of the work cylinder 4' and the inside wall of a jacket 17'.

There is a flow connection into the equalization chamber 16' from the upper work chamber 5' via the boring 18', the bypass 8' and the damping valve 7'. In this flow connection, the damping valve 7' controls a variable fluid circulation.

Figure 10:
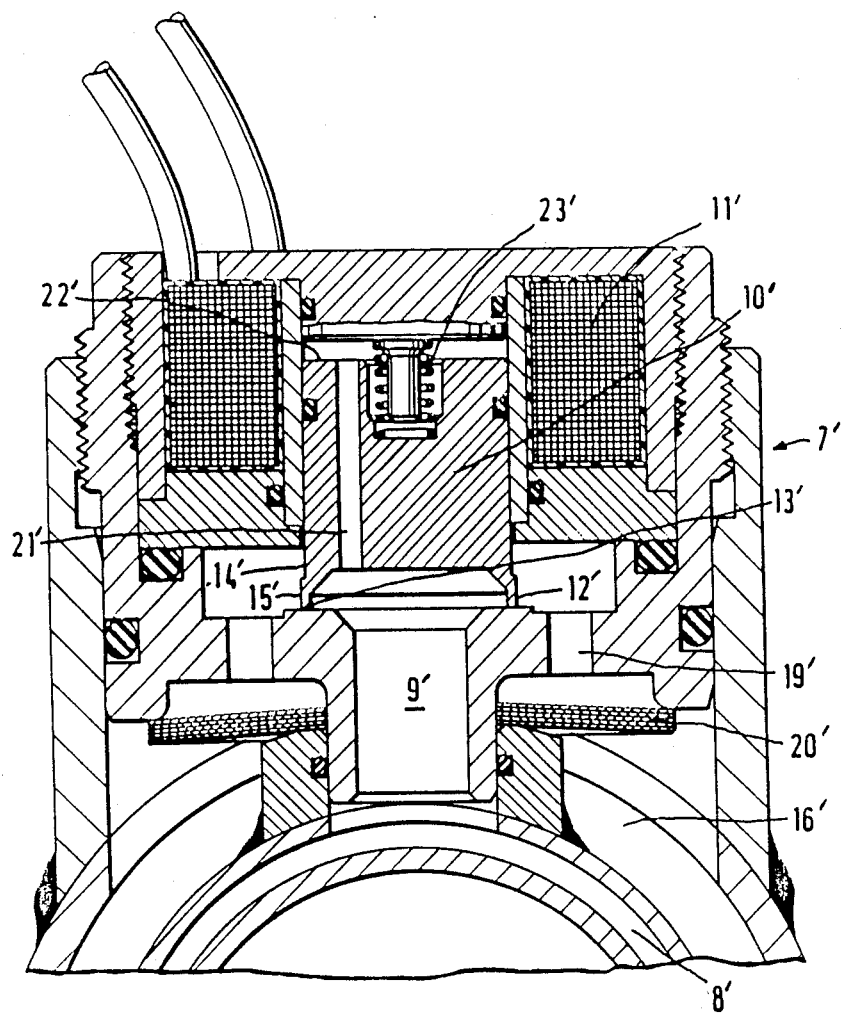
FIG. 10 shows a damping valve with an electromagnet in section, and in detail.

FIG. 10 shows a detail of a damping valve 7' whereby, starting from a bypass channel 8', the damping fluid travels through a passage 9', past a valve body 10', via borings 19' on a spring washer valve 20' into an equalization chamber 16'. The valve body 10' is also the armature for an electromagnet 11'. The valve body 10' is equipped, on its side facing the passage 9', with a sealing surface 12', which seals it against the passage 9'. The boring 21' of the valve body 10' assures that, on the back side of the valve body 10', an appropriate work pressure is accumulated on an end surface 22'. The sealing surface 12' of the valve body 10' exhibits an inside diameter 13', the surface of which is smaller than the end surface of the end 22', so that the work pressure of the shock absorber exerts a slight auxiliary closing force on the valve body 10'. By achieving an appropriate relationship between the surface area of the end 22' and the area of the inside diameter 13', it is possible to exercise a favorable hydraulic action on the switchover intervals of the electromagnet. This hydraulic assist of the valve body 10' also makes possible the use of a switch valve return spring 23' with very low return forces. That increases the available magnetic force at the armature (valve body 10') of the damping valve 7', which is important for the switchover interval.

When the valve body 10' is open, the pressure determined by the damping valve 20' of the bypass valve acts via the surface formed by an outside diameter 14' and 15' of the valve body 10' as an auxiliary force on the closing process of the valve body 10' of the damping valve 7'.

Figure 11:
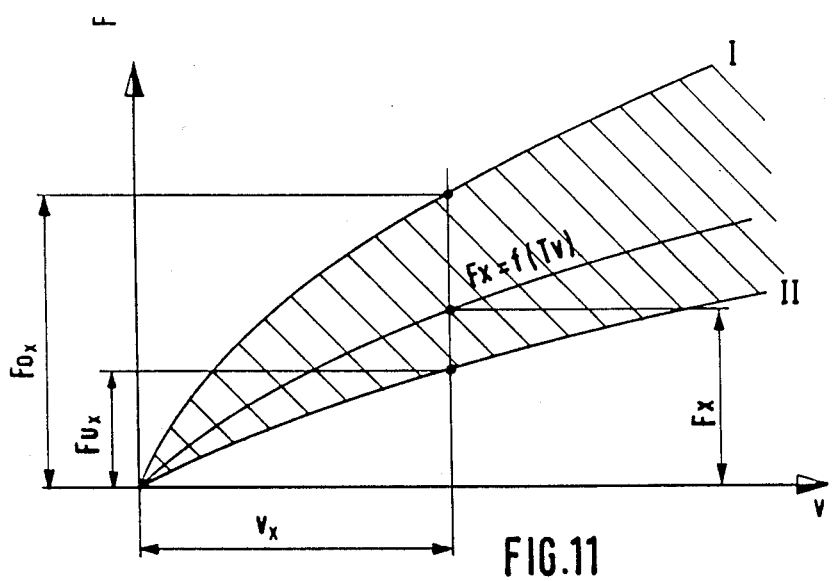
FIG. 11 shows a force-velocity diagram of an adjustable shock absorber with a bypass valve.

FIG. 11 is a force-velocity diagram of the shock-absorbing strut illustrated in FIG. 9. The damping force is plotted in relation to the piston velocity. Curve I represents the damping curve when the valve body 10' is closed. Curve II relates to the open valve body. Between the Curve I and the Curve II, there is a regulating field, which covers damping forces which can be achieved when the electromagnet 11' is correspondingly activated. If, for example, the damping force Fx is achieved at a piston velocity Vx, then a corresponding pulse width repetition rate is to be set, as shown in FIG. 12.

Figure 12:
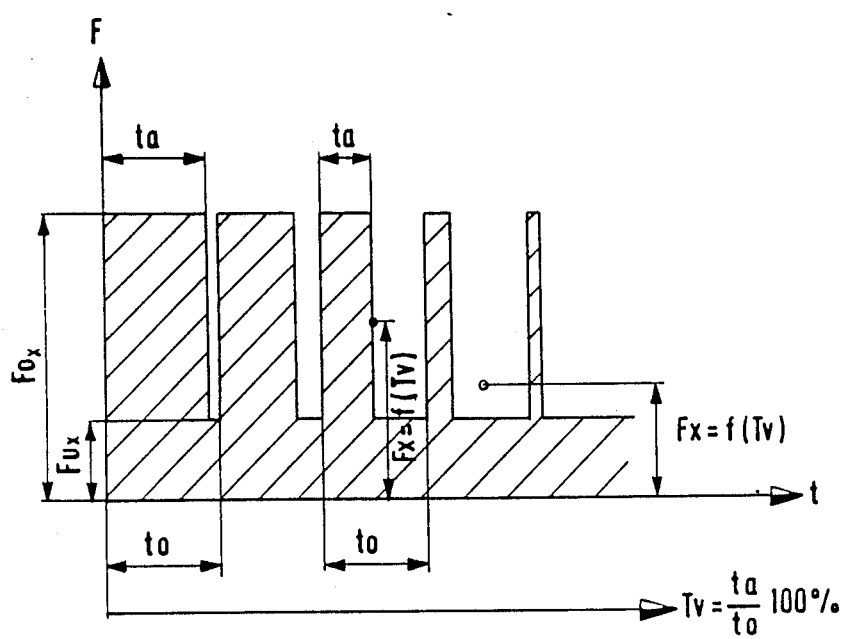
FIG. 12 is the diagram of a damping force action at the point Vx (piston velocity)

FIG. 12 shows one example for influencing the damping force at point Vx. It has been assumed, to make the diagram easier to understand, that Vx is constant over a rather long period of time t. The damping force curve $Fo_x$ is a point from the fundamental Curve I in FIG. 11. The damping force $Fu_x$ represents, at the same point Vx, a point of the fundamental Curve II of the curve shown in FIG. 11. In this diagram, the pulse width repetition rate is an important criterion. The pulse width repetition rate is defined as:

$$Tv = ta/to$$

In percentage form:

$$Tv(\%) = ta/to \cdot 100$$

With a pulse width repetition rate of 100%, the fundamental Curve I is reached, since the bypass via the valve body 10' is closed. The closing time is specified at 100% during a time constant (to). If, at a pulse width repetition rate of 0, the bypass 8' via the valve body 10' is opened for the entire time of the time constant (to), then the lower fundamental Curve II applies. Now, if for example, a geometric mean value is achieved exactly halfway between the upper fundamental Curve I and the lower fundamental Curve II, then a pulse width repetition rate of 50% is necessary. With a pulse width repetition rate of 50%, one-half of the time constant (to), the valve body 10' is closed, and the other one-half of the time constant, it is open.

FIG. 12 shows that the damping force Fx can be varied between $Fo_x$ and $Fu_x$ as a function of the selection of the pulse width repetition rate Tv. The variation follows the formula:

$$Fx = Fo_x - (Fo_x - Fu_x) \cdot Tv$$

Where:
Fx = the damping force to be achieved;
$Fo_x$ = the upper damping force at a piston velocity Vx;
$Fu_x$ = lower damping force at a piston velocity Vx; and
Tv = pulse width repetition rate.

According to this formula, any other desired curve between these extreme fundamental curves can be achieved, by solving the formula for the pulse width repetition rate, and using the corresponding value to control the electromagnet 11'. It can be seen that the regulating precision for the electromagnet for the value lying between the upper and the lower limit of the effective damping force Fx is a function of the level of the clock frequency of the electromagnet.

The idealized form of the force curve F over the time t shown in FIG. 12 does not occur in a practical application, since the construction and axle fastening elements of the shock absorber, the tires and other bearings in the geometry of the embodiment produce a rounded curve form, because of their elastic behavior.

Figure 13:
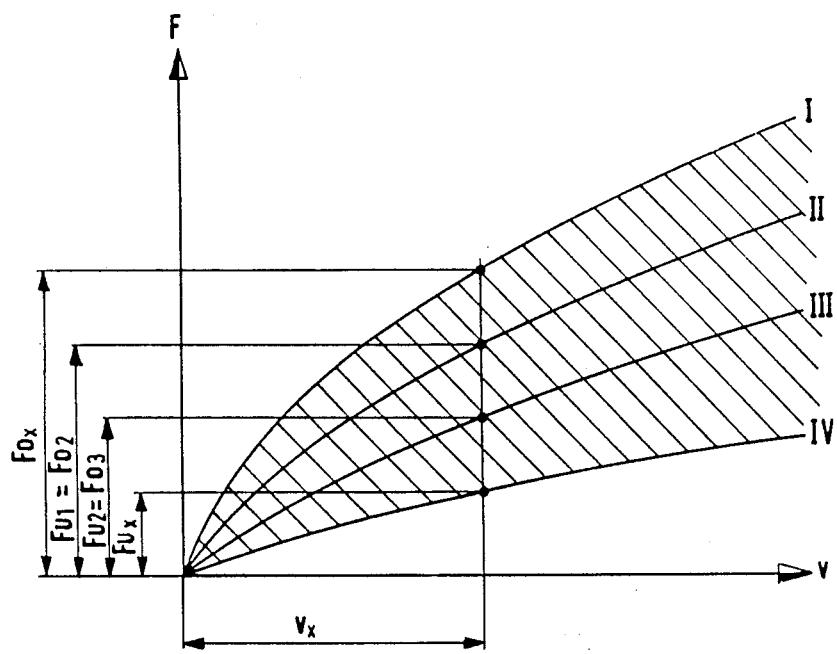
FIG. 13 is another force-velocity diagram with four different fundamental curves and, in relation to them, three corresponding partial regulating fields.

The force-velocity diagram shown in FIG. 13 includes curves which are obtained when, for example, two damping valves 7' are used. The goal of this application is to reduce the damping force discontinuity between Fo and Fu. When two damping valves 7' are used, the regulating field which can be affected by pulse width modulation can be divided into three partial fields, with reduced damping force discontinuities. The damping force fundamental Curves I to IV are achieved, as a function of the switching combination of the damping valves 7'.

In the fundamental Curve I, both valve bodies 10' are closed. The fundamental Curve II shows a first valve body 10' open and the second valve body closed. The fundamental Curve III shows that the second valve body 10' is open and the first valve body, on the other hand, is closed. In the fundamental Curve IV, both valve bodies 10' are opened. This switching combination yields the ability to vary the curves in the individual partial regulating fields.

The partial regulating field 1' is covered by electronic activation of the electromagnet 11' of the first damping valve 7', while the second damping valve 7' remains closed. The partial regulating field 2' covers situations in which both damping valves 7' are operated by means of their electromagnets 11', whereby the signals run inverse to one another. In the partial regulating field 3', the second damping valve 7' is open, while the first damping valve 7' acts via its electromagnet on the valve body 10'. In this diagram, too, the desired damping force Fx at the velocity Vx is achieved via the above-mentioned formula:

$$Fx = Fo_x - (Fo_x - Fu_x) \cdot Tv$$

The setting of the damping forces is therefore always guaranteed in a partial regulating field, and extreme damping force discontinuities can thereby be avoided.

Figure 14:
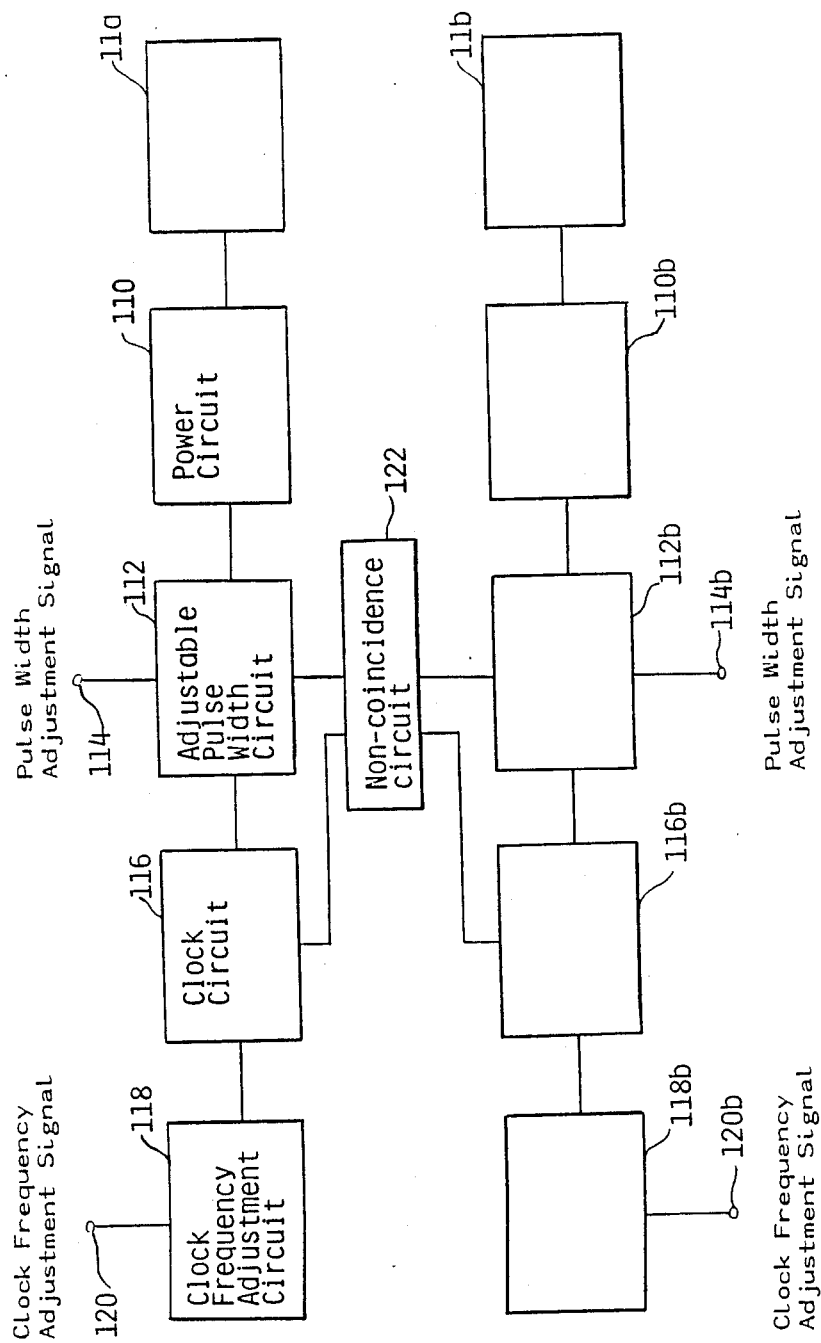
FIG. 14 shows a circuit for the operation of the electromagnets of the damping valve according to an embodiment of the invention.

FIG. 14 shows a circuit for the operation of the electromagnets 11' of the valve body 10'. In FIG. 14, two separate electromagnets 11a and 11b are shown, each being associated with a different valve body 10'. When the circuitry as shown in FIG. 14 operates, it corresponds to the operation which has been described hereinabove related to FIG. 13. If only one valve body 10' with a single electromagnet 11' is to be used, only one of the two circuits shown in FIG. 14 need be used.

As shown in FIG. 14, an electromagnet 11a is connected to a power circuit 110, which provides the voltage pulses for the activation of electromagnet 11a in accordance with the operation as shown in FIG. 12. The power circuit 110 is controlled by an adjustable pulse width circuit 112, which provides signals for the turning on and turning off of the power circuit 110, thereby providing the voltage pulses to the electromagnet 11a. The voltage pulses from the power circuit 110 may also be current pulses or a combination of current and voltage pulses. The pulse width of the adjustable pulse width circuit 112 is adjusted by an external signal which may enter preferably at a terminal 114 of the adjustable pulse width circuit 112. A clock circuit 116 is connected to the adjustable pulse width circuit 112 in order to provide a clock pulse for the adjustable pulse width circuit 112 for the starting of each and every pulse, preferably. In order to adjust the frequency of the clock circuit 116, if so desired, which frequency may be typically in the order of a few Hertz, for example, 2 to 3 Hertz to about 10 to 25 Hertz or even higher, depending upon the design of the electromagnet 11a, a clock adjustment circuit 118 is connected to the clock circuit 116, whereby the clock frequency may be altered depending upon the desires of the driver of the motor vehicle having the vibrational damping system of the present invention, or depending upon other sensors which are described in U.S. Pat. No. 4,577,509 (Attorney Docket No. NHL-BGG-01); U.S. Pat. No. 4,587,850 (Attorney Docket No. NHL-BGG-02); application Ser. No. 700,451 (Attorney Docket No. NHL-BGG-04); filed on Feb. 11, 1985, entitled "Vibration Damper Apparatus", U.S. Pat. No. 4,645,189 (Attorney Docket No. NHL-BGG-05); application Ser. No. 735,452 (Attorney Docket No. NHL-BGG-06), filed on May 17, 1985, entitled "Adjustable Hydraulic Shock Absorber"; U.S. Pat. No. 4,641,872 (Attorney Docket No. NHL-BGG-07); U.S. Pat. No. 4,638,670 (Attorney Docket No. NHL-BGG-08); U.S. Pat. No. 4,650,042 (Attorney Docket No. NHL-BGG-15) and application Ser. No. 772,316, (Attorney Docket No. NHL-BGG-16) filed on Sept. 4, 1985, entitled "Hydraulic Vibration Damper Having Adjustable Damping Valve" for the adjustment of the clock adjustment signal, all of which are incorporated by reference as if the entire contents thereof were fully set forth herein. A computer such as that shown in U.S. Pat. No. 4,650,042 may be used to adjust the signals shown to come from outside the circuitry of FIG. 14. Also, the pulse width adjustment signal at the terminal 114 may also be adjusted by these same ways as the clock adjustment signal entering a terminal 120 of the clock adjustment circuit. Circuits analogous to the circuits 110 through 118 may be connected to a second electromagnet 11b of the second valve body 10'. These circuits which are designated by the reference numerals 110b through 118b, correspond to the circuits as originally described above with regard to the circuits connected to the electromagnet 11a. There also may be interconnections between the adjustable pulse width circuits in order that both electromagnets do not open up simultaneously, or that under special conditions, they will open up simultaneously. Additional circuits such as a pulse width adjustment signal at 114 and 114b may be interconnected so that the pulse widths of each electromagnet 11a and 11b are different. Also, the clock circuits may wish to have different clock period starting times in order that not both of the electromagnets 11a and 11b open up and close simultaneously for which purpose a non-coincidence circuit 122 is preferably provided, which is preferably connected to the clock circuits 116 and 116b and to the adjustable pulse width circuits 112 and 112b whereby the initial edges of the pulses are non-coincident with one another. The non-coincidence circuit 122 can also adjust the falling edge of the pulses to assure non-coincidence of these as well.

Also, one set of circuits 110 through 118 or 110b through 118b may be shut down and only one set may be activated. In the event that only one electromagnet is used in an installation, only one set of circuits 110 through 118 need be provided.

Figure 15:
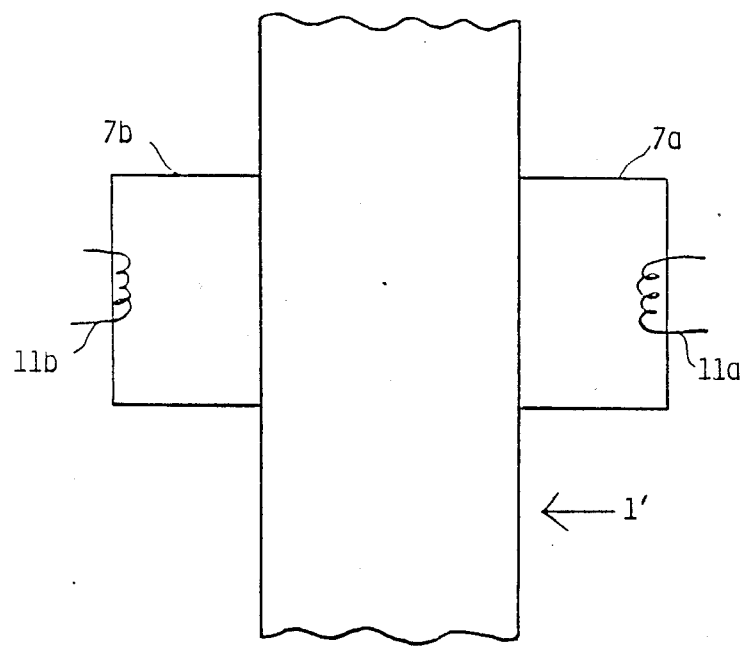
FIG. 15 shows the hydraulic shock absorber of FIG. 1 with two damping valves.

Going now to FIG. 15, the shock absorber strut 1' (illustrated in FIG. 9) is shown with a first damping valve 7a and a second damping valve 7b connected thereto. The damping valves 7a and 7b, each having an electromagnet 11a and 11b corresponding to those in FIG. 14, are substantially identical to the damping valve 7' shown in FIG. 9.

In review, the present invention relates to shock absorbers for vehicles, in which there is a damping element, which has a work cylinder holding a damping medium and divided into two work chambers by a piston, whereby at least partly to control the damping force, an electromagnetically activated and axially moving valve body of a valve pressurizes a flow passage. A variable damping adjustment becomes possible, and by means of a variably controlled damping valve, any desired adjustable damping of the decompression and compression stage can be achieved. In addition, by varying the effective hydraulically-influenced functional surfaces of the valve body, the switching, frequency, closing and opening action of the valve body, designed as the armature of an electromagnet, can be influenced. To solve the problem, a seat surface oriented at approximately right angles to the axis of rotation of the valve body forms, together with the end surface of the valve body, a valve seat, whereby at least a portion of the end surface of the valve body and of the valve seat are located at a distance from one another. This configuration makes it possible to achieve a partial pressure reduction influencing the valve body in the area of the valve seat.

Varying the effective hydraulically-influenced functional surfaces of the valve body, the switching, frequency, closing and opening action of the valve body, designed as the armature of an electromagnet, can be influenced. To solve the problem, a seat surface oriented at approximately right angles to the axis of rotation of the valve body forms, together with the end surface of the valve body, a valve seat, whereby at least a portion of the end surface of the valve body and of the valve seat are located at a distance from one another. This configuration makes it possible to achieve a partial pressure reduction influencing the valve body in the area of the valve seat.

The vibration damper according to an alternative embodiment of the invention comprises the second portion of the first end of an electromagnetically-displaceable component which is displaced away from the first portion of the first end for making contact with the valve seat, the first end thereby for producing a partial pressure reduction adjacent the electromagnetically-displaceable component for assisting snap-action.

The vibration damper according to yet another alternative embodiment of the invention comprises the ratio of the at least one upstream surface to the at least one downstream surface being between about one-half and about one.

The vibration damper according to still another alternative embodiment of the invention comprises at least one upstream surface which comprises an annular surface and at least one additional surface, the ratio of the area of the surface to the area of the additional surface being in a range from substantially zero to substantially one-half.

The vibration damper according to a further alternative embodiment of the invention comprises the electromagnetically-displaceable component comprising a valve body having a cylindrical outer surface.

The vibration damper according to a yet further alternative embodiment of the invention comprises the second portion of the first end comprising a conical surface.

The vibration damper according to still yet another alternative embodiment of the invention comprises the second portion of the first end comprising a planar surface.

The vibration damper according to yet still another alternative embodiment of the invention comprises the valve seat having a recess, the second portion being disposable a given distance from the recess in the closed position.

The vibration damper according to another alternative embodiment of the invention includes an orifice extended through the electromagnetically-displaceable component from the first to the second end thereof, the orifice having an area, the ratio of the area of the orifice to a remainder of the second end being from about 0.002 to about 0.85.

The vibration damper according to yet another alternative embodiment of the invention comprises the controlling circuitry which comprises: an arrangement for generating an electrical signal which is repetitive and has a variable pulse width; and the arrangement for generating, providing a signal to vary the cross section of the flow cross section of the valving arrangement periodically, including circuitry for generating a repetitive pulse of a given frequency and circuitry for varying an on-time of the pulse from a minimum pulse width to a maximum pulse width for varying the damping of the piston over a substantially continuous range between a minimum and a maximum value, whereby the piston assembly provides a resultant damping being between the damping produced by the first flow cross section and the damping produced by the second flow cross section.

An alternative embodiment of the present invention relates further to a hydraulic, adjustable shock absorber with a piston fastened to a piston rod which divides a work cylinder into two work chambers filled with damping fluid, whereby at least partly to control the damping force, an electromagnetically-activated and axially-moving valve body of a valve pressurizes a passage, whereby the valve body has a hydraulic connection running from the passage to the rear end surface of the valve body, and a seat surface oriented approximately perpendicular to the axis of rotation of the valve body, together with the end wall of the valve body, forms a valve seat, wherein at least a portion of the end surface 14 of the valve body 8 and the valve seat 16 are at a distance E from one another, whereby the ratio of the pressurized end surface 14 to the rear pressurized end surface 10 is 0.5–1.0, and the ratio of the pressurized annular surface 27 to the rear pressurized end surface 10 is 0–0.5.

Further, in yet another alternative embodiment of the invention, the valve body 8 of the hydraulic, adjustable shock absorber exhibits a cylindrical outer surface.

In still yet another alternative embodiment of the invention, at least a portion of the end surface 14 of the valve body 8 is conical.

In yet still another alternative embodiment of the invention, the end surface 14 of the valve body 8 is plane and the area adjacent to the valve seat 16 exhibits a recess 15, which is at a distance E from the end surface 14 of the valve body 8.

Further, in another alternative embodiment of the invention, the ratio of the effective cross section of the hydraulic connection 11 to the rear pressurized end surface 10 is 0.002–0.85.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:
   means for throttling said damping fluid when said dumping fluid moves from one of said chambers into another;
   said piston assembly having a piston rod and piston;
   said piston rod having first means for attachment of said piston rod at one end thereof;
   said cylinder assembly having second means for attachment at a portion thereon other than said first means for attachment at said piston rod;
   means for bypassing at least a portion of the damping fluid;
   means for accepting bypassed damping fluid;
   said bypassing means being disposed to bypass said damping fluid from one of said dumping fluid-containing chambers to said accepting means;
   said bypassing means including damping valve means for regulating flow of said damping fluid in said bypassing means;
   said valving means including:
   an electromagnetically-displaceable component for effecting a substantial snap-action change between a closed flow cross section and an open flow cross section in said valving means; and
   electromagnetic means for varying the cross section flow of said valving means between said closed and open flow cross sections by displacing said electromagnetically-displaceable component, said electromagnetic means having means for connection to controlling circuitry;
   said electromagnetically-displaceable component having at least one upstream surface for being exposed to higher pressure in a closed position of said valve means than at least one downstream surface, said at least one downstream surface having an area which is chosen from a member of the group consisting essentially of an area equal to and an area smaller than the area of said at least one upstream surface to aid in snap-action transition of said electromagnetically-displaceable component from said open flow cross section to said closed flow cross section;
   said valve means having a valve seat;
   said electromagnetically-displaceable component having a first end and a second end, said first end having at least one of said at least one downstream surface disposed thereon;
   said first end having a first portion, for contacting said valve seat, and a second portion disposed closer toward said second end than said first portion is disposed to said second end, said second portion being displaced away from and avoiding contact with said valve seat.

2. The vibration damper for motor vehicles according to claim 1, wherein said second portion of said first end of said electromagnetically-displaceable component is displaced away from said first portion of said first end, said first portion of said first end for making contact with said valve seat, said first end with its second portion being for producing a partial pressure reduction adjacent said electromagnetically-displaceable component for assisting in snap-action closing of said electromagnetically-displaceable component.

3. The vibration damper for motor vehicles according to claim 2, wherein each at least one upstream surface has at least one area and each at least one downstream surface has an area;

the ratio of the at least one area of the at least one upstream surface to the at least one area of the at least one downstream surface is between about one-half and about one.

4. The vibration damper for motor vehicles according to claim 2, wherein said at least one upstream surface comprises an annular surface and at least one additional surface, the ratio of the area of said surface to the area of said additional surface being in a range from substantially zero to substantially one-half.

5. The vibration damper for motor vehicles according to claim 1, wherein each at least one upstream surface has at least one area and each at least one downstream surface has an area;

the ratio of the at least one area of the at least one upstream surface to the at least one area of the at least one downstream surface is between about one-half and about one.

6. The vibration damper for motor vehicles according to claim 5, wherein said at least one upstream surface comprises an annular surface and at least one additional surface, the ratio of the area of said surface to the area of said additional surface being in a range from substantially zero to substantially one-half.

7. The vibration damper for motor vehicles according to claim 6, wherein said second portion of said first end comprises a conical surface.

8. The vibration damper for motor vehicles according to claim 6, wherein said valve seat has a recess, said second portion being disposable a given distance from said recess in the closed position.

9. The vibration damper for motor vehicles according to claim 6, including an orifice extended through said electromagnetically-displaceable component from said first to said second end thereof, said orifice having an area, the ratio of said area of said orifice to a remainder of the area of the second end being from about 0.002 to about 0.85.

10. The vibration damper for motor vehicles according to claim 6, wherein said controlling circuitry comprises:

means for generating an electrical signal which is repetitive and has a variable pulse width; and said means for generating, providing a signal to vary the cross section of said flow cross section of said valving means periodically, including circuitry for generating a repetitive pulse of a given frequency and circuitry for varying an on-time of said pulse from a minimum pulse width to a maximum pulse width for varying said damping of said piston over a substantially continuous range between a minimum and a maximum value, whereby said piston assembly provides a resultant damping being between the damping produced by said first flow cross section and the damping produced by said second flow cross section.

11. The vibration damper for motor vehicles according to claim 6, wherein said second portion of said first end comprises a planar surface.

12. The vibration damper for motor vehicles according to claim 11, including an orifice extended through said electromagnetically-displaceable component from said first to said second end thereof, said orifice having an area, the ratio of said area of said orifice to a remainder of the area of the second end being from about 0.002 to about 0.85.

13. The vibration damper for motor vehicles according to claim 1, wherein said at least one upstream surface comprises an annular surface and at least one additional surface, the ratio of the area of said surface to the area of said additional surface being in a range from substantially zero to substantially one-half.

14. The vibration damper for motor vehicles according to claim 1, wherein said electromagnetically-displaceable component comprises a valve body having a cylindrical outer surface.

15. The vibration damper for motor vehicles according to claim 1, wherein said second portion of said first end comprises a conical surface.

16. The vibration damper for motor vehicles according to claim 1, wherein said second portion of said first end comprises a planar surface.

17. The vibration damper for motor vehicles according to claim 1, wherein said valve seat has a recess, said second portion being disposable a given distance from said recess in the closed position.

18. The vibration damper for motor vehicles according to claim 1, including an orifice extended through said electromagnetically-displaceable component from said first to said second end thereof, said orifice having an area, the ratio of said area of said orifice to a remainder of the area of the second end being from about 0.002 to about 0.85.

19. The vibration damper for motor vehicles according to claim 1, wherein said controlling circuitry comprises:

means for generating an electrical signal which is repetitive and has a variable pulse width; and said means for generating, providing a signal to vary the cross section of said flow cross section of said valving means periodically, including circuitry for generating a repetitive pulse of a given frequency and circuitry for varying an on-time of said pulse from a minimum pulse width to a maximum pulse width for varying said damping of said piston over a substantially continuous range between a minimum and a maximum valve, whereby said piston assembly provides a resultant damping being between the damping produced by said first flow cross section and the damping produced by said second flow cross section.

* * * * *